US005968470A

United States Patent [19]

Persello

[11] Patent Number: 5,968,470

[45] **Date of Patent: *Oct. 19, 1999**

[54] PRECIPITATED SILICA PARTICULATES HAVING CONTROLLED POROSITY

[75] Inventor: Jacques Persello, Saint Andre de Concy, France

[73] Assignee: Rhone-Poulenc Chimie, Courbevoie Cedex, France

[ * ] Notice: This patent is subject to a terminal disclaimer.

[21] Appl. No.: 08/227,285

[22] Filed: Apr. 13, 1994

Related U.S. Application Data

[62] Division of application No. 07/826,217, Jan. 24, 1992, Pat. No. 5,342,598, which is a continuation of application No. 07/547,227, Jul. 3, 1990, abandoned.

[30] Foreign Application Priority Data

Jul. 3, 1989 [FR] France .................................. 89/08874

[51] Int. Cl.[6] .................................................... C01B 33/12

[52] U.S. Cl. ............................................ 423/339; 423/335

[58] Field of Search .................................... 423/339, 325, 423/332, 335

[56] References Cited

U.S. PATENT DOCUMENTS

| | | | |
|---|---|---|---|
| 2,731,326 | 1/1956 | Alexander et al. | 23/182 |
| 3,070,426 | 12/1962 | Winyall . | |
| 3,794,712 | 2/1974 | Aboutboul et al. . | |
| 3,800,031 | 3/1974 | Sale et al. . | |
| 3,803,046 | 4/1974 | Winyall et al. . | |
| 3,860,682 | 1/1975 | Reinhardt et al. . | |
| 3,893,840 | 7/1975 | Wason . | |
| 3,954,944 | 5/1976 | Aldcroft et al. | 423/335 |
| 3,963,512 | 6/1976 | Swift et al. . | |
| 3,988,162 | 10/1976 | Wason . | |
| 4,015,996 | 4/1977 | Wason . | |
| 4,040,858 | 8/1977 | Wason . | |
| 4,045,240 | 8/1977 | Wason et al. . | |
| 4,049,781 | 9/1977 | Acker et al. . | |

(List continued on next page.)

FOREIGN PATENT DOCUMENTS

| | | |
|---|---|---|
| 0031271 | 1/1981 | European Pat. Off. . |
| 0046057 | 2/1982 | European Pat. Off. . |
| 0 139 754 | 5/1985 | European Pat. Off. . |
| 0 407 262 | 1/1991 | European Pat. Off. . |
| 1327033 | 12/1960 | France . |
| 25 44 218 | 4/1977 | Germany . |
| 29 29 906 | 11/1979 | Germany . |
| 35 25 802 | 1/1987 | Germany . |
| 60-204613 | 10/1985 | Japan . |
| 62-56319 | 3/1987 | Japan . |
| 710015 | 6/1954 | United Kingdom . |
| 719918 | 12/1954 | United Kingdom . |
| 1580672 | 12/1980 | United Kingdom . |

OTHER PUBLICATIONS

"*Perry's Chemical Engineers' Handbook*", Green & maloney, 6th Edition, pp. 18.1–18.3, 18.50, McGraw Hill, NY, NY (1984).

Wason, S. K., "Cosmetic Properties and Structure of Fine–Particle Synthetic Precipitated Silicas", *J. Soc. Cosmet. Chem.*, vol. 29, pp. 497–521 (Aug., 1978).

*Primary Examiner*—Wayne Langel
*Attorney, Agent, or Firm*—Burns, Doane, Swecker & Mathis, L.L.P.

[57] ABSTRACT

Precipitated silica particulates having a BET specific surface ranging from 20 to 300 $m^2/g$, a CTAB specific surface ranging from 10 to 200 $m^2/g$, an oil uptake (DBP) ranging from 80 to 400 $cm^3/100$ g, a pore volume ranging from 1 to 10 $cm^3/g$ and a mean pore diameter ranging from 10 to 50 nm, well adapted for such applications as the coating of paper and catalysis, are prepared by (a) simultaneously introducing a silicate and an acid into a dispersion of colloidal silica, thereby providing a silica suspension, (b) next decreasing the pH of such suspension to a value ranging from 3 to 7, and (c) then separating the silica particulates from the final suspension and drying them.

25 Claims, 1 Drawing Sheet

U.S. PATENT DOCUMENTS

| | | | |
|---|---|---|---|
| 4,076,549 | 2/1978 | Wason . | |
| 4,144,321 | 3/1979 | Wason . | |
| 4,191,742 | 3/1980 | Wason et al. . | |
| 4,216,113 | 8/1980 | Winyall . | |
| 4,251,281 | 2/1981 | Machurat et al. . | |
| 4,272,509 | 6/1981 | Wason . | |
| 4,274,766 | 6/1981 | Joubert et al. . | |
| 4,331,706 | 5/1982 | Kindrick . | |
| 4,340,583 | 7/1982 | Wason . | |
| 4,422,880 | 12/1983 | Wason . | |
| 4,508,607 | 4/1985 | Winyall . | |
| 4,562,065 | 12/1985 | Hayes et al. . | |
| 4,562,066 | 12/1985 | Hayes et al. . | |
| 4,581,292 | 4/1986 | Shinpo et al. . | |
| 4,590,052 | 5/1986 | Chevallier et al. . | |
| 4,676,964 | 6/1987 | Seki et al. . | |
| 4,704,425 | 11/1987 | Lagarde et al. . | |
| 4,708,859 | 11/1987 | Chevallier . | |
| 4,738,838 | 4/1988 | Shinpo et al. | 423/339 |
| 4,842,838 | 6/1989 | Chevallier . | |
| 4,874,594 | 10/1989 | Chevallier . | |
| 4,956,167 | 9/1990 | Oldcroft et al. . | |
| 4,973,462 | 11/1990 | Akira et al. . | |
| 5,124,143 | 6/1992 | Mühlemann et al. . | |
| 5,614,177 | 3/1997 | Persello | 423/335 |
| 5,616,316 | 4/1997 | Persello | 423/335 |

PRECIPITATED SILICA PARTICULATES HAVING CONTROLLED POROSITY

This application is a divisional of application Ser. No. 07/826,217, filed Jan. 24, 1992, U.S. Pat. No. 5,342,598 which is a continuation of application Ser. No. 07/547,227, filed Jul. 3, 1990 (now abandoned).

BACKGROUND OF THE INVENTION

1. Field of the Invention

The present invention relates to novel silica particulates, and, more especially, to novel precipitated silica particulates having a controlled porosity, as well as to a process for the production thereof.

2. Description of the Prior Art

Silica is known to this art to be useful for certain applications because of its porosity characteristics, in particular for catalysis, inks and paper, in the food industry, etc.

In catalysis, the silica is used as a catalytic support, or as a porous layer coated or impregnated on monolithic supports.

Due to its optical whiteness and opacity, silica is used as an inorganic charge in papers, particularly those used for newspapers, as a coating material for coated papers and also specialty papers. When silica is used in paper, a greater porosity is required in order to facilitate ink absorption.

More particularly in the field of animal feeds, silica is used as a result of its absorption properties as a feed support, particularly as a support for methionine, vitamins, particularly vitamins A and E, for sucroglycerides, etc.

Thus, for these and numerous other applications, it is necessary for the silica to have certain morphological characteristics, including particular porosity.

SUMMARY OF THE INVENTION

Accordingly, a major object of the present invention is the provision of novel silica particulates having improved porosity.

Another object of the present invention is the provision of a particular process for the production of such novel silica particulates having a controlled porosity.

Briefly, the present invention features precipitated silica particulates having a BET specific surface ranging from 20 to 300 $m^2/g$, a CTAB specific surface ranging from 10 to 200 $m^2/g$, an oil uptake (DBP) ranging from 80 to 400 $cm^3/100$ g, a total pore volume ranging from 1 to 10 $cm^3/g$ and a mean pore diameter ranging from 10 to 50 nm.

DETAILED DESCRIPTION OF THE PREFERRED EMBODIMENTS OF THE INVENTION

Figure 1:
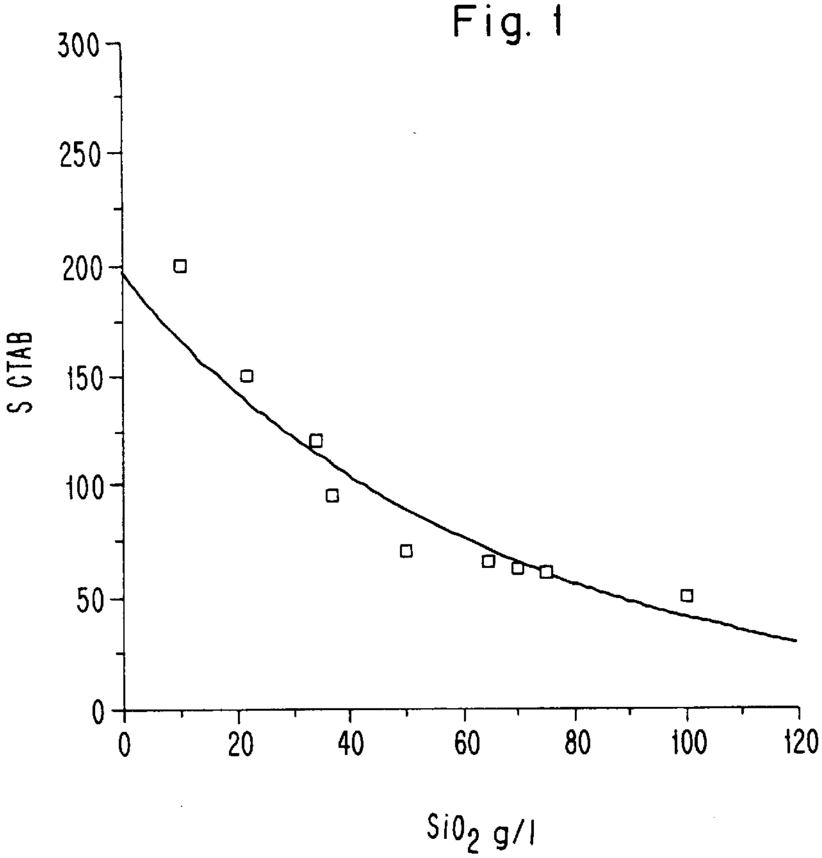
FIG. 1 is a graph of CTAB versus amount of $SiO_2$ in a colloidal silica dispersion in the absence of an electrolyte.

More particularly according to the present invention, the subject precipitated silica particulates have an optimized pore volume, i.e., pores with a diameter ranging from 10 to 50 nm, irrespective of the specific surface within the above range, such that said silica particulates present a maximum adsorption surface and absorption capacity.

The silica particulates according to this invention have a BET specific surface area ranging from 20 to 300 and preferably from 60 to 200 $m^2/g$. The BET specific surface is determined according to the method of Brunauer-Emmett-Teller described in the *Journal of the American Chemical Society,* vol. 60, p. 309 (February 1938) and French standard X11-622 (3.3).

The CTAB specific surface characteristically ranges from 10 to 200 and preferably from 60 to 200 $m^2/g$. The CTAB specific surface area is the external surface defined according to ASTM standard D3765, but effecting hexadecyl trimethyl ammonium bromide (CTAB) adsorption at pH 9 and using 35 $Å^2$ as the projected area of the CTAB molecule.

The silica particulates of this invention have an oil uptake (DBP) ranging from 80 to 400 $cm^3/100$ g of silica, determined according to French standard 30-022 (March 1953) using dibutyl phthalate. More preferably this oil uptake ranges from 100 to 350 $cm^3/100$ g.

As regards the porosity characteristics of the silica particulates according to this invention, they have a pore volume ranging from 1 to 10 and preferably from 2 to 5 $cm^3/g$. The mean pore diameter is within a relatively small range of 10 to 50 and preferably 20 to 30 nm.

The determination of the inter-aggregate pore volume and the determination of the population of pores corresponding to said volume are carried out using a mercury porosimeter (COULTRONICS 9300 pore sizer). The mercury is made to penetrate into the pores of the degassed sample; in this manner, a porosity curve is plotted representing the evolution of the volume of the pores as a function of the pressure or the radius of the pores. This porosity curve is plotted in accordance with the technique described by N. M. Wilnslow and J. J. Shapiro in ASTM Bulletin, p. 39 (February 1959).

The array of aggregates produces an inter-aggregate porosity, the filling of which with mercury results in the appearance of a step on the porosity curve. This step height enables determination of the inter-aggregate pore volume. The inclination of the step reflects the population distribution of the pores. The derived curve has a finer peak appearance as the homogeneity of the population of the inter-aggregate pores increases.

The specific surface and porosity characteristics of the silica particulates of this invention will be more fully described hereinafter which can be modified according to the process for the production thereof.

The grain size of the silica particulates is adapted as a function of their intended use. The mean diameter of the agglomerates can vary widely from 0.5 to 20 and preferably from 1 to 10 $\mu$m. The mean diameter is a diameter such that 50% by weight of the agglomerates have a diameter greater or smaller than the mean diameter. This mean agglomerate diameter is measured using a Coulter counter.

The pH of the silica particulates according to the invention typically ranges from 4 to 8 and preferably from 5 to 7. This pH value is determined according to French standard 45007 (5.5).

The silica particulates according to this invention can be prepared by an original process comprising simultaneously adding a silicate and an acid into a colloidal silica dispersion, thereby producing a silica suspension; next decreasing the pH to a value ranging from 3 to 7; and then separating the silica particulates and subjecting them to a drying operation.

A preferred embodiment of the process according to the invention comprises the supplementary addition of an electrolyte to the initial colloidal silica dispersion.

One method for preparing the colloidal silica dispersion, which preferably has a concentration of 1 to 150 g/l, comprises heating an aqueous silicate solution, e.g., to a temperature of from 60° to 95° C. and adding the acid to such aqueous solution until a pH ranging from 8 to 10, and preferably approximately 9.5, is attained.

The concentration of the aqueous silicate solution, expressed in terms of $SiO_2$ context, preferably ranges from 20 to 150 g/l. It is possible to use a dilute or concentrated acid and its normality can range from 0.5 to 36 N and preferably from 1 to 2 N.

By the term “silicate” is advantageously intended an alkali metal silicate and preferably a sodium silicate having a $SiO_2/Na_2O$ weight ratio of from 2 to 4 and preferably of 3.5. The acid can be gaseous, such as carbon dioxide gas, or liquid and preferably sulfuric acid.

In another embodiment of the invention, it is possible to limit the number of colloids in the colloidal dispersion by adding an electrolyte. Typically, an inorganic or organic salt, and preferably an alkali metal or ammonium salt, is thus added. Exemplary such salts include sodium sulfate, sodium chloride, sodium acetate, ammonium sulfate, ammonium chloride, and the like.

The electrolyte can be used in solid form or in the form of an aqueous solution, the concentration of which advantageously ranges from 0 to 50 g/l of colloidal dispersion.

According to the process of this invention, a silicate and an acid are simultaneously added to the colloidal silica dispersion, optionally incorporating an electrolyte. The two reagents are added simultaneously such that the pH is maintained constant at a value ranging from 8 to 10 and preferably from 8.5 to 9.5. The temperature advantageously ranges from 60° to 95° C.

The concentration of the silicate solution, expressed in terms of $SiO_2$ content, advantageously ranges from 40 to 250 g/l of colloidal silica dispersion and preferably from 80 to 150 g/l.

In the next step of the process of the invention, the pH is adjusted to a value ranging from 3 to 7. It is adjusted to the desired pH by adding acid. It is possible to thus add an inorganic acid, such as nitric, hydrochloric, sulfuric or phosphoric acid, or a carbonic acid formed by bubbling carbon dioxide gas through the dispersion.

This provides a silica suspension having a concentration, expressed in terms of $SiO_2$ context which preferably ranges from 40 to 80 g/l.

The volume constituted by the colloidal silica dispersion starting material preferably constitutes from 10% to 20% of the volume of the final suspension, preferably approximately 15%.

The silica particulates are then separated from the reaction medium by any known means, such as, e.g., a vacuum filter or filter press. This provides a silica filter cake. In a preferred embodiment of the invention, the silica cake can be washed. It is typically washed with deionized water and/or with an acid solution having a pH of from 2 to 7. This acid solution can be, for example, an aqueous solution of an inorganic acid, such as nitric acid.

However, in another embodiment of the invention, said acid solution can also be an aqueous solution of an organic acid, particularly a complexing organic acid. Exemplary such acids are carboxylic, dicarboxylic, hydroxycarboxylic and aminocarboxylic acids. Representative such acids include acetic acid and representative complexing acids include tartaric, maleic, glyceric, gluconic and citric acid.

From a practical standpoint, the washing operations are advantageously carried out by pouring the wash solution onto the cake, or by introducing it into the suspension obtained following the disintegration or crumbling of the cake.

Thus, prior to the drying operation, the filter cake is disintegrated. This is carried out by any known means, e.g., using a high speed stirrer.

The silica cake, before or after washing, is consequently disintegrated and then dried by any known means. The drying can be carried out in a muffle or tunnel furnace, or by atomization in a hot air flow, the inlet temperature of which can range from approximately 200° to 500° C., while the outlet temperature ranges from 80° to 100° C. The residence time advantageously ranges from 10 seconds to 5 minutes.

The dried material can be ground, if necessary, in order to provide the desired grain size. The latter is conditioned by the intended application. In general, the operation is carried out in such manner that the mean diameter of the agglomerates ranges from 0.05 to 20 and preferably from 1 to 10 $\mu$m. In the case of use of the silica in paper, the grain size advantageously ranges from 1 to 3 $\mu$m. The operation is carried out in a conventional apparatus, such as an air jet or knife grinder.

The process of this invention produces silica particulates having those morphological characteristics described above.

One of the characteristics of the process according to the invention is that it enables monitoring the morphology of the silica final product and, in particular, its specific surface. Thus, it has been found that the final characteristics of the silica obtained could be correlated and, in the same manner, selected as a function of the number and size of the colloids present in the initial colloidal silica dispersion.

However, it has also been found that the number and size of the colloids in said dispersion could be monitored by the choice of the concentration of the silica in the colloidal silica dispersion by the presence or absence of an electrolyte and by the choice of its concentration.

Referring to the Figures of Drawing, FIG. 1 is a graph plotting the CTAB specific surface variation curve (A) in $m^2/g$ of the silica obtained, as a function of the concentration expressed in g/l of silica in the colloidal silica dispersion and in the absence of any electrolyte.

Figure 2:
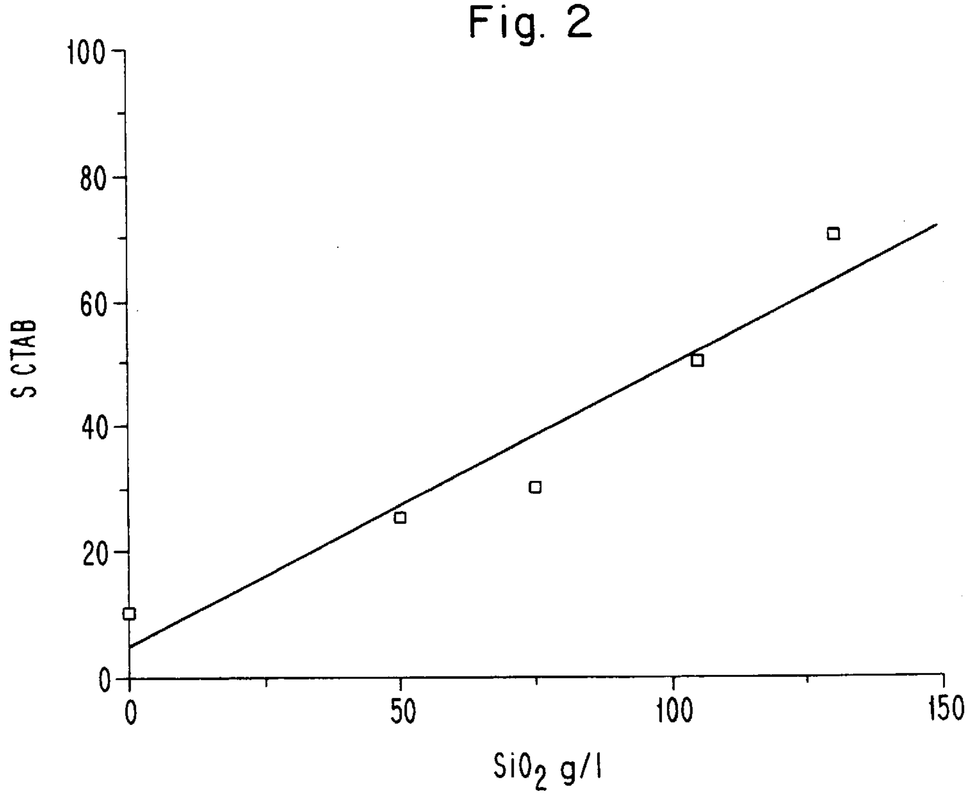
FIG. 2 is a graph of CTAB versus amount of $SiO_2$ in a colloidal silica dispersion in the presence of an electrolyte.

FIG. 2 is a graph plotting the CTAB specific surface variation curve (B) as a function of the silica concentration and in the presence of an electrolyte, namely, sodium sulfate at a rate of 20 g/l.

From curves 1 and 2, one skilled in this art can readily determine the operating conditions for obtaining the desired specific surface characteristics. If a small specific surface is desired, i.e., below approximately 80 $m^2/g$, an electrolyte should be used during the preparation of the colloidal silica dispersion. However, if a large specific surface is desired, preferably greater than 150 $m^2/g$, a low silica concentration in the colloidal silica dispersion should be selected, e.g., preferably below 50 g/l.

Another advantage of the process according to the invention is that it provides a relatively constant inter-aggregate pore size over a wide specific surface range, as will be seen in the examples below.

Because of the above unique morphological characteristics, the silica particulates of the invention are useful for numerous applications, in particular for catalysis, paper, food supports, etc.

In order to further illustrate the present invention and the advantages thereof, the following specific examples are given, it being understood that same are intended only as illustrative and in nowise limitative.

EXAMPLE 1

Synthesis of a silica having a CTAB specific surface of 150 $m^2/g$:

5 liters of deionized water and 1 liter of an aqueous 130 g/l sodium silicate solution were introduced into a reactor equipped with a pH and temperature regulating system and a turbine stirring system.

After initiating stirring (350 r.p.m.), the thus formed sediment was heated to 85° C. and the pH was adjusted to 9.5 over 8 minutes by adding an 80 g/l aqueous sulfuric acid solution. When the temperature of 85° C. was attained, 10 liters of an aqueous sodium silicate solution having a silica concentration of 130 g/l, a $SiO_2/Na_2O$ ratio of 3.5 and at a flow rate of 0.20 l/min and 7 liters of an 80 g/l aqueous sulfuric acid solution were simultaneously introduced. The acid flow rate was adjusted such as to maintain the pH of the medium at a constant value of 9.2 (mean flow rate: 0.14 l/min).

After continuing such addition for 50 min, the silicate addition was terminated and the acid addition continued until the pH of the reaction mixture was stabilized at 5. The mixture was then filtered and the wet filter cake washed with deionized water until the conductivity of the filtrate was below 1 millisiemens. The cake obtained was dried by atomization and ground on a grinder of the jet pulverizer type in order to provide a grain size of 2 microns.

The physicochemical characteristics of the thus obtained silica were as follows:

| | |
|---|---|
| BET surface | 200 $m^2/g$ |
| CTAB surface | 150 $m^2/g$ |
| Oil uptake | 320 $cm^3/100$ g |
| pH at 5% in water | 7 |
| % Sulfate | 0.5 |
| Humidity at 105° C. (%) | 5.9 |
| Ignition weight loss at 1,000° C. (%) | 9.1 |
| Cake loss at 105° C. (%) | 80 |
| Total pore volume | 3.6 $cm^3/g$ |
| Mean diameter of pores | 35 nm |

EXAMPLE 2

Synthesis of a silica having a CTAB specific surface of 120 $m^2/g$:

4.4 liters of deionized water and 1.6 liters of 130 g/l aqueous sodium silicate solution were introduced into a reactor equipped with a temperature and pH regulating system and a turbine stirring system.

After initiating stirring (350 r.p.m.), the thus formed sediment was heated to 92° C. and the pH adjusted to 9.5 over 8 minutes by adding an 80 g/l aqueous sulfuric acid solution.

After attaining the temperature of 92° C., 12 liters of an aqueous sodium silicate solution having a silica concentration of 130 g/l, an $SiO_2/Na_2O$ ratio of 3.5 and at a flow rate of 0.20 l/min, as well as 7.2 liters of an 80 g/l aqueous sulfuric acid solution, were simultaneously introduced. The acid flow rate was adjusted such as to maintain the pH of the medium at a constant value of 9.5 (mean flow rate: 0.120 l/min).

Following 60 min of addition, the silicate addition was terminated and the acid addition continued until the pH of the reaction mixture was stabilized at 5. The mixture was then filtered and the wet filter cake washed with deionized water until the conductivity of the filtrate was below 1 millisiemens. The cake obtained was dried by atomization and ground on a jet pulverizer to provide a grain size of 2 microns.

The physicochemical characteristics of the thus obtained silica were as follows:

| | |
|---|---|
| BET surface | 150 $m^2/g$ |
| CTAB surface | 120 $m^2/g$ |
| Oil uptake | 200 $cm^3/100$ g |
| pH at 5% in water | 4 |
| % Sulfate | 2.5 |
| Humidity at 105° C. (%) | 4 |
| Ignition weight loss at 1,000° C. (%) | 9 |
| Cake loss at 105° C. (%) | 80 |
| Total pore volume | 3.3 $cm^3/g$ |
| Mean diameter of pores | 35 nm |

EXAMPLE 3

Synthesis of a silica having a CTAB specific surface of 60 $m^2/g$:

2.5 liters of deionized water and 2.5 liters of a 130 g/l aqueous sodium silicate solution were introduced into a reactor equipped with a temperature and pH regulating system and a turbine stirring system.

After initiating stirring (350 r.p.m.), the thus formed sediment was heated to 90° C. and the pH adjusted to 9.5 over 8 minutes by adding an 80 g/l aqueous sulfuric acid solution.

When a temperature of 90° C. was attained, 15 liters of aqueous sodium silicate solution having a silica concentration of 130 g/l, a $SiO_2/Na_2O$ ratio of 3.5 and at a flow rate of 0.25 l/min, as well as 9 liters of an 80 g/l aqueous sulfuric acid solution, were simultaneously introduced. The acid flow rate was adjusted such as to maintain the pH of the medium at a constant value of 9.5 (mean flow rate: 0.15 l/min).

After continuing the addition for 60 min, the silicate addition was terminated and the acid addition continued until the pH of the reaction mixture was stabilized at 5. The mixture was then filtered and the wet filter cake washed with deionized water until the conductivity of the filtrate was below 1 millisiemens. The cake obtained was dried by atomization and ground on a jet pulverizer to provide a grain size of 2 microns.

The physicochemical characteristics of the thus obtained silica were as follows:

| | |
|---|---|
| BET surface | 80 $m^2/g$ |
| CTAB surface | 60 $m^2/g$ |
| Oil uptake | 120 $cm^3/100$ g |
| pH at 5% in water | 4 |
| % Sulfate | 2.5 |
| Humidity at 105° C. (%) | 4 |
| Ignition weight loss at 1,000° C. (%) | 8 |
| Cake loss at 105° C. (%) | 80 |
| Total pore volume | 3.3 $cm^3/g$ |
| Mean diameter of pores | 40 nm |

EXAMPLE 4

Synthesis of a silica having a CTAB specific surface of 30 $m^2/g$:

4 liters of a 75 g/l aqueous sodium silicate solution and 80 g of an aqueous sodium sulfate solution were introduced into a reactor equipped with a temperature and pH regulating system and a turbine stirring system.

After initiating stirring (350 r.p.m.), the thus formed sediment was heated to 90° C. The pH of the sediment was adjusted to 9 by adding 80 g/l sulfuric acid at a constant flow rate of 0.058 l/min.

This was followed by the simultaneous addition of 14.4 l of sodium silicate having a silica concentration of 130 g/l, a $SiO_2/Na_2O$ ratio of 3.5 and with a flow rate of 0.240 l/min, as well as 9.42 l of sulfuric acid having a concentration of 80 g/l. The acid flow rate was adjusted such as to maintain the pH of the medium at a constant value of 9.2 (mean flow rate: 0.16 l/min).

At the end of the simultaneous addition, the silicate addition was terminated and the acid addition continued at a constant flow rate of 0.073 l/min until the pH of the reaction mixture was stabilized at 4.2. The mixture was then filtered and the wet filter cake washed with deionized water until the conductivity of the filtrate was below 1 millisiemens. The cake obtained was dried by atomization and ground on a jet pulverizer to provide a grain size of 5 microns.

The physicochemical characteristics of the thus obtained silica were as follows:

| | |
|---|---|
| BET surface | 50 $m^2/g$ |
| CTAB surface | 30 $m^2/g$ |
| Oil uptake | 90 $cm^3/100$ g |
| pH at 5% in water | 5 |
| Total pore volume | 1.25 $cm^3/g$ |
| Mean pore diameter | 50 nm |

EXAMPLE 5

Synthesis of a silica having a CTAB specific surface of 50 $m^2/g$:

4 liters of a 105 g/l aqueous sodium silicate solution and 80 g of an aqueous sodium sulfate solution were introduced into a reactor equipped with a temperature and pH regulating system and a turbine stirring system.

After initiating stirring (350 r.p.m.), the thus formed sediment was heated to 90° C. and the pH was adjusted to 9 by adding 80 g/l sulfuric acid at a constant flow rate of 0.138 l/min.

This was followed by the simultaneous addition of 14.09 l of sodium silicate having a silica concentration of 130 g/l, a $SiO_2/Na_2O$ ratio of 3.5 and at a flow rate of 0.23 l/min, as well as 8.28 l of sulfuric acid having a concentration of 80 g/l. The acid flow rate was adjusted such as to maintain the pH of the medium at a constant value of 9.2 (mean flow rate: 0.14 l/min).

At the end of the simultaneous addition, the silicate addition was terminated and the acid addition continued at a constant rate of 0.075 l/min until the pH of the reaction mixture was stabilized at 4.2. The mixture was then filtered and the wet filter cake washed with deionized water until the conductivity of the filtrate was below 1 millisiemens. The cake obtained was dried by atomization and ground on a jet pulverizer to provide a grain size of 5 microns.

The physicochemical characteristics of the thus obtained silica were as follows:

| | |
|---|---|
| BET surface | 60 $m^2/g$ |
| CT AB surface | 50 $m^2/g$ |
| Oil uptake | 100 $cm^3/100$ g |
| pH at 5% in water | 5 |
| Total pore volume | 1.65 $cm^3/g$ |
| Mean pore diameter | 50 nm |

EXAMPLE 6

Synthesis of a silica having a CTAB specific surface of 100 $m^2/g$:

4 liters of a 130 g/l aqueous sodium silicate solution and 80 g of an aqueous sodium sulfate solution were introduced into a reactor equipped with a temperature and pH regulating system and a turbine stirring system.

After initiating stirring (350 r.p.m.), the thus formed sediment was heated to 90° C. and adjusted to a pH of 9.7 by adding 80 g/l sulfuric acid at a constant flow rate of 0.045 l/min.

This was followed by the simultaneous addition of 13.64 l of sodium silicate having a silica concentration of 130 g/l, a $SiO_2/Na_2O$ ratio of 3.5 and at a flow rate of 0.227 l/min, as well as 5.2 l of sulfuric acid having a concentration of 80 g/l. The acid flow rate was adjusted to maintain the pH of the medium at a constant value of 9.5 (mean flow rate: 0.157 l/min).

At the end of the simultaneous addition, the silicate addition was terminated and the acid addition continued at a constant flow rate of 0.073 l/min until the pH of the reaction mixture was stabilized at 4.2. The mixture was then filtered and the wet filter cake washed with deionized water until the conductivity of the filtrate was below 1 millisiemens. The cake obtained was dried by atomization and ground on a jet pulverizer to provide a grain size of 5 microns.

The physicochemical characteristics of the thus obtained silica were as follows:

| | |
|---|---|
| BET surface | 150 $m^2/g$ |
| CTAB surface | 100 $m^2/g$ |
| Oil uptake | 150 $cm^3/100$ g |
| pH at 5% in water | 5 |
| Total pore volume | 2.5 $cm^3/g$ |
| Mean pore diameter | 45 nm |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of precipitated silica particles having a BET specific surface area ranging from 20 to 300 $m^2/g$, a CTAB specific surface area ranging from 10 to 200 $m^2/g$, an oil uptake (DBP) ranging from 80 to 400 $cm^3/100$ g, a pore volume ranging from 1 to 10 $cm^3/g$ and a mean pore diameter ranging from 10 to 50 nm comprising (a) simultaneously introducing a silicate and an acid into a dispersion of colloidal silica and adding an electrolyte to said dispersion of colloidal silica, thereby providing a silica suspension, and adjusting the specific surface area by controlling number and size of colloids in the dispersion, (b) next decreasing the pH of said suspension to a value ranging from 3 to below 6.5, and (c) then separating the silica particles from said suspension and drying them.

2. The process as defined by claim 1, said dispersion of colloidal silica comprising an aqueous dispersion.

3. The process as defined by claim 1, said electrolyte comprising an organic or inorganic salt.

4. The process as defined by claim 3, said organic or inorganic salt comprising a salt of an alkali metal or an ammonium salt.

5. The process as defined by claim 2, comprising simultaneously introducing the silicate and the acid such that the pH of the suspension is maintained constant at a value ranging from 8 to 10.

6. The process as defined by claim 2, carried out at a temperature ranging from 60° to 95° C.

7. The process as defined by claim 2, said dispersion of colloidal silica containing 1 to 150 g/l of silica and having been prepared by heating an aqueous silicate solution at a temperature ranging from 60° to 95° C. and adding the acid to such aqueous solution until a pH ranging from 8 to 10 is attained.

8. The process as defined by claim 7, wherein the concentration of the silicate solution, expressed as silica, ranges from 40 to 250 g/l of a dispersion of colloidal silica.

9. The process as defined by claim 1, wherein the concentration of the electrolyte ranges from 0 to 50 g/l of dispersion.

10. The process as defined by claim 2, wherein the volume of the colloidal silica dispersion constitutes from 10% to 20% of the volume of the final suspension.

11. The process as defined by claim 2, further comprising washing said separated silica particulates prior to the drying thereof.

12. The process as defined by claim 5, comprising maintaining the pH of the suspension at a value ranging from 8.5 to 9.5.

13. The process as defined by claim 7, comprising adding the acid to such aqueous solution until a pH of about 9.5 is attained.

14. The process as defined by claim 8, wherein said concentration of the silicate solution, expressed as silica, ranges from 80 to 150 g/l.

15. The process as defined by claim 10, wherein the volume of the colloidal silica dispersion is about 15% of the volume of the final suspension.

16. The process defined by claim 11, comprising washing said separated silica particulates with deionized water, an aqueous acid solution or deionized water and an aqueous solution.

17. The process defined by claim 1, wherein the pH in step (b) is decreased to a value of 4.2 or higher.

18. A process for the preparation of precipitated silica particles having a BET specific surface area ranging from 20 to 300 $m^2/g$, a CTAB specific surface area ranging from 10 to 200 $m^2/g$, an oil uptake (DBP) ranging from 80 to 400 $cm^3/100$ g, a pore volume ranging from 1 to 10 $cm^3/g$ and a mean pore diameter ranging from 10 to 50 nm comprising (a) simultaneously introducing a silicate and an acid into an aqueous dispersion of colloidal silica and adding an electrolyte to said dispersion of colloidal silica, thereby providing a silica suspension, the silicate and acid being simultaneously introduced such that the pH of the suspension is maintained constant at a value ranging from 8.5 to 9.5, and adjusting the specific surface area by controlling number and size of colloids in the dispersion, (b) next decreasing the pH of said suspension to a value ranging from 3 to below 6.5, and (c) then separating the silica particles from said suspension and drying them.

19. The process of claim 18, wherein the pH of the suspension is decreased to a value higher than 3.0.

20. The process of claim 18, wherein the pH of the suspension is decreased to a value higher than 3.5.

21. The process of claim 18, wherein the pH of the suspension is decreased to a value of 4.2 or higher.

22. The process of claim 18, wherein the electrolyte is added to a dispersion of colloidal silica having a $SiO_2$ content higher than 100 g/l and the CTAB specific area of the precipitated silica particles is at least 50 $m^2/g$.

23. The process of claim 18, wherein the electrolyte is added to a dispersion of colloidal silica having a $SiO_2$ content of 100 g/l or lower and the CTAB specific area of the precipitated silica particles is lower than 50 $m^2/g$.

24. The process of claim 18, wherein the electrolyte is added to a dispersion of colloidal silica having a $SiO_2$ content and the CTAB specific area of the precipitated silica particles is adjusted according to FIG. 2.

25. A process for the preparation of precipitated silica particles having a BET specific surface area ranging from 20 to 80 $m^2/g$, a CTAB specific surface area ranging from 10 to 200 $m^2/g$, an oil uptake (DBP) ranging from 80 to 400 $cm^3/100$ g, a pore volume ranging from 1 to 10 $cm^3/g$ and a mean pore diameter ranging from 10 to 50 nm comprising (a) simultaneously introducing a silicate and an acid into an aqueous dispersion of colloidal silica and adjusting the specific surface area by adding an electrolyte to said dispersion of colloidal silica to obtain a BET specific surface area of $\leqq 80$ $m^2/g$, thereby providing a silica suspension, the silicate and acid being simultaneously introduced such that the pH of the suspension is maintained constant at a value ranging from 8.5 to 9.5, and adjusting the specific surface area by controlling number and size of colloids in the dispersion, (b) next decreasing the pH of said suspension to a value ranging from 3 to below 6.5, and (c) then separating the silica particles from said suspension and drying them.

* * * * *